US009626700B1

(12) United States Patent
Thimsen et al.

(10) Patent No.: US 9,626,700 B1
(45) Date of Patent: Apr. 18, 2017

(54) AGGREGATION OF OPERATIONAL DATA FOR MERCHANDIZING OF NETWORK ACCESSIBLE SERVICES

(75) Inventors: John Daniel Thimsen, Seattle, WA (US); David Zipkin, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 655 days.

(21) Appl. No.: 13/249,032

(22) Filed: Sep. 29, 2011

(51) Int. Cl.
*G06Q 30/00* (2012.01)
*G06Q 30/06* (2012.01)
*G06F 9/455* (2006.01)
*G06F 9/50* (2006.01)

(52) U.S. Cl.
CPC ............. *G06Q 30/06* (2013.01); *G06F 9/455* (2013.01); *G06F 9/5077* (2013.01)

(58) Field of Classification Search
CPC .... G06Q 30/0601; G06Q 30/02; G06Q 30/00; G06Q 30/0201; G06Q 30/06; G06F 9/455; G06F 9/5077
USPC ................................................ 705/26.1, 27.1
See application file for complete search history.

(56) References Cited

U.S. PATENT DOCUMENTS

| | | | |
|---|---|---|---|
| 4,788,637 | A | 11/1988 | Tamaru |
| 5,757,908 | A | 5/1998 | Cooper et al. |
| 5,870,717 | A | 2/1999 | Wiecha |
| 6,442,448 | B1 | 8/2002 | Finley et al. |
| 6,664,981 | B2 | 12/2003 | Ashe et al. |
| 6,735,768 | B1 | 5/2004 | Tanaka |

(Continued)

FOREIGN PATENT DOCUMENTS

| | | |
|---|---|---|
| CA | 2554462 | 8/2005 |
| CN | 103959317 A | 7/2014 |

(Continued)

OTHER PUBLICATIONS

"Sforce 2.0—Industry's First On-Demand Application Server—Deployed Immediately to 120,000 Subscribers and 8400 Customers with Salesforce.com Winter '04 Release", Business Wire: 5278. Business Wire (Dec. 8, 2003).*

(Continued)

*Primary Examiner* — Anne Georgalas
(74) *Attorney, Agent, or Firm* — Knobbe, Martens, Olson & Bear LLP

(57) ABSTRACT

An electronic service image marketplace for service images is provided that permits users to browse descriptions of service images implementing desired functionalities of a virtual machine image. The described service images may be further offered for purchase through the electronic service image marketplace. An operational data service, in communication with the electronic service image marketplace, may collect operational data from a plurality of host computing devices executing the selected service image. The operational data service may further analyze the collected operational data to obtain an aggregate measure of operational data for the selected service image when executed by host computing devices. The analyzed operational data may be further provided to the electronic service image marketplace for display within the description of the selected service image. Notifications may be further provided to a user of a selected service image based upon a comparison of the analyzed operational data to operational data of the selected service image.

26 Claims, 9 Drawing Sheets

(56) References Cited

U.S. PATENT DOCUMENTS

| | | | |
|---|---|---|---|
| 6,910,071 B2 | 6/2005 | Quintero et al. | |
| 7,089,259 B1 | 8/2006 | Kouznetsov et al. | |
| 7,165,041 B1 | 1/2007 | Guheen et al. | |
| 7,315,830 B1 | 1/2008 | Wirtz et al. | |
| 7,324,969 B2 | 1/2008 | Pallister et al. | |
| 7,386,483 B1 | 6/2008 | Lee et al. | |
| 7,401,080 B2 | 7/2008 | Benton et al. | |
| 7,433,835 B2 * | 10/2008 | Frederick | G06Q 20/102 705/26.1 |
| 7,457,870 B1 | 11/2008 | Lownsbrough et al. | |
| 7,466,835 B2 | 12/2008 | Stenberg et al. | |
| 7,467,206 B2 * | 12/2008 | Moore et al. | 709/225 |
| 7,729,954 B2 | 6/2010 | Frederick et al. | |
| 7,729,955 B2 | 6/2010 | Frederick et al. | |
| 7,778,874 B1 | 8/2010 | Saunders | |
| 7,797,198 B1 | 9/2010 | Frederick et al. | |
| 7,797,271 B1 | 9/2010 | Bonneau et al. | |
| 7,801,771 B1 | 9/2010 | Sirota et al. | |
| 7,894,448 B1 | 2/2011 | Lillibridge et al. | |
| 7,908,358 B1 | 3/2011 | Prasad et al. | |
| 7,953,642 B2 | 5/2011 | Dierks | |
| 7,958,529 B2 | 6/2011 | Green et al. | |
| 8,005,723 B1 | 8/2011 | Sirota et al. | |
| 8,019,652 B1 | 9/2011 | Frederick et al. | |
| 8,019,653 B1 | 9/2011 | Frederick et al. | |
| 8,019,660 B2 | 9/2011 | Westphal | |
| 8,024,225 B1 | 9/2011 | Sirota et al. | |
| 8,185,220 B2 | 5/2012 | Lloyd | |
| 8,306,840 B2 | 11/2012 | Cohen et al. | |
| 8,442,234 B2 | 5/2013 | Brown et al. | |
| 8,601,583 B1 | 12/2013 | Chandrasekhar et al. | |
| 8,645,377 B2 | 2/2014 | Ness et al. | |
| 9,118,641 B1 | 8/2015 | Paris, III | |
| 9,258,371 B1 | 2/2016 | Lai et al. | |
| 9,397,987 B1 | 7/2016 | Lai et al. | |
| 2002/0120461 A1 | 8/2002 | Kirkconnell-Ewing et al. | |
| 2002/0120519 A1 | 8/2002 | Martin et al. | |
| 2002/0120554 A1 | 8/2002 | Vega | |
| 2003/0041094 A1 | 2/2003 | Lara et al. | |
| 2003/0078850 A1 | 4/2003 | Hartman et al. | |
| 2003/0195813 A1 | 10/2003 | Pallister et al. | |
| 2003/0200185 A1 | 10/2003 | Huerta et al. | |
| 2003/0217357 A1 | 11/2003 | Parry | |
| 2004/0010440 A1 | 1/2004 | Lenard et al. | |
| 2004/0024795 A1 | 2/2004 | Hind et al. | |
| 2004/0122926 A1 | 6/2004 | Moore et al. | |
| 2004/0243583 A1 | 12/2004 | Olsen | |
| 2004/0267552 A1 | 12/2004 | Gilliam et al. | |
| 2005/0010916 A1 | 1/2005 | Hagen et al. | |
| 2005/0039034 A1 | 2/2005 | Doyle et al. | |
| 2005/0114437 A1 | 5/2005 | Creamer et al. | |
| 2005/0125362 A1 | 6/2005 | Cheng et al. | |
| 2005/0256882 A1 | 11/2005 | Able et al. | |
| 2006/0085785 A1 * | 4/2006 | Garrett | G06F 9/5061 718/1 |
| 2007/0022447 A1 | 1/2007 | Arseneau et al. | |
| 2007/0067297 A1 | 3/2007 | Kublickis | |
| 2007/0118530 A1 | 5/2007 | Chow et al. | |
| 2007/0130156 A1 | 6/2007 | Tenhunen et al. | |
| 2007/0233540 A1 | 10/2007 | Sirota | |
| 2007/0260612 A1 | 11/2007 | Papakonstantinou et al. | |
| 2007/0294399 A1 * | 12/2007 | Grossner | H04L 12/2602 709/224 |
| 2007/0300240 A1 * | 12/2007 | Viegener et al. | 719/320 |
| 2008/0022414 A1 | 1/2008 | Cahn et al. | |
| 2008/0077532 A1 | 3/2008 | Von Heesen et al. | |
| 2008/0080396 A1 | 4/2008 | Meijer et al. | |
| 2008/0098462 A1 | 4/2008 | Carter | |
| 2008/0103975 A1 | 5/2008 | Taratino et al. | |
| 2008/0155038 A1 | 6/2008 | Bachmann et al. | |
| 2008/0178169 A1 | 7/2008 | Grossner et al. | |
| 2008/0235602 A1 | 9/2008 | Strauss et al. | |
| 2009/0037337 A1 | 2/2009 | Baitalmal et al. | |
| 2009/0037492 A1 | 2/2009 | Baitalmal et al. | |
| 2009/0100331 A1 | 4/2009 | Sauve et al. | |
| 2009/0119779 A1 | 5/2009 | Dean et al. | |
| 2009/0138380 A1 | 5/2009 | Roseman et al. | |
| 2009/0235244 A1 | 9/2009 | Enomori et al. | |
| 2009/0241037 A1 | 9/2009 | Hyndman | |
| 2009/0248883 A1 | 10/2009 | Suryanarayana et al. | |
| 2009/0249324 A1 | 10/2009 | Brar et al. | |
| 2009/0254978 A1 | 10/2009 | Rouskov et al. | |
| 2009/0288082 A1 | 11/2009 | Nazeer et al. | |
| 2009/0300607 A1 | 12/2009 | Ferris et al. | |
| 2010/0064277 A1 | 3/2010 | Baird et al. | |
| 2010/0114739 A1 | 5/2010 | Johnston | |
| 2010/0131084 A1 | 5/2010 | Van Camp | |
| 2010/0131283 A1 | 5/2010 | Linthicum et al. | |
| 2010/0186007 A1 | 7/2010 | Jeong | |
| 2010/0242088 A1 | 9/2010 | Thomas | |
| 2010/0257043 A1 | 10/2010 | Kassaei et al. | |
| 2010/0262508 A1 | 10/2010 | Volnak | |
| 2011/0119191 A1 | 5/2011 | Stern et al. | |
| 2011/0126110 A1 | 5/2011 | Vilke et al. | |
| 2011/0161172 A1 | 6/2011 | Lee | |
| 2011/0167173 A1 | 7/2011 | Bansal et al. | |
| 2011/0173028 A1 | 7/2011 | Bond | |
| 2011/0214124 A1 | 9/2011 | Ferris et al. | |
| 2011/0231846 A1 * | 9/2011 | Sabin | G06F 9/5072 718/100 |
| 2011/0296000 A1 * | 12/2011 | Ferris et al. | 709/224 |
| 2012/0054731 A1 | 3/2012 | Aravamudan et al. | |
| 2012/0059917 A1 | 3/2012 | Dawson et al. | |
| 2012/0096521 A1 | 4/2012 | Peddada | |
| 2012/0131566 A1 | 5/2012 | Morgan et al. | |
| 2012/0137001 A1 | 5/2012 | Ferris | |
| 2012/0226808 A1 | 9/2012 | Morgan | |
| 2012/0265561 A1 | 10/2012 | Patro | |
| 2012/0278229 A1 | 11/2012 | Vishwanathan et al. | |
| 2012/0278439 A1 | 11/2012 | Ahiska et al. | |
| 2012/0311135 A1 | 12/2012 | DeLuca | |
| 2013/0013533 A1 | 1/2013 | Agarwal et al. | |
| 2013/0054336 A1 | 2/2013 | Graylin | |
| 2013/0085892 A1 | 4/2013 | Golden et al. | |
| 2013/0085899 A1 | 4/2013 | Tyra et al. | |
| 2013/0132854 A1 | 5/2013 | Raleigh et al. | |
| 2013/0268437 A1 | 10/2013 | Desai et al. | |
| 2013/0276142 A1 | 10/2013 | Peddada | |
| 2014/0109046 A1 | 4/2014 | Hirsch et al. | |
| 2014/0178851 A1 | 6/2014 | Tang et al. | |
| 2015/0135281 A1 | 5/2015 | Peddada | |
| 2016/0156725 A1 | 6/2016 | Lai et al. | |

FOREIGN PATENT DOCUMENTS

| | | |
|---|---|---|
| CN | 104115177 A | 10/2014 |
| EP | 2761555 | 8/2014 |
| EP | 2761558 | 8/2014 |
| GB | 2426362 | 11/2006 |
| JP | 2003-44602 | 2/2003 |
| JP | 2007-149096 A | 6/2007 |
| JP | 2010-277187 A | 12/2010 |
| JP | 4743726 B1 | 8/2011 |
| WO | WO 2005/072342 A2 | 8/2005 |
| WO | WO 2013/049393 | 4/2013 |
| WO | WO 2013/049395 | 4/2013 |

OTHER PUBLICATIONS

Ebay Advertising Targeting homepage., http://www.ebayadvertising.com/en/display-ads-targeting [Accessed Feb. 17, 2012.], 2012, pp. 1.

Ranganathan et al., Advertising in a Pervasive Computing Environment, University of Illinois, date unknown, pp. 6, Urbana, IL.

Ebay, Inc.; Ebay Advertising Targeting homepage. 2012. Accessed Feb. 17, 2012. http://www.ebayadvertising.com/en/display-ads-targeting. 1 pg.

International Search Report and Written Opinion in PCT/US2012/057624 mailed Dec. 6, 2012.

International Search Report and Written Opinion in PCT/US2012/057626 mailed Dec. 24, 2012.

(56) References Cited

OTHER PUBLICATIONS

Ranganathan et al., Advertising in a Pervasive Computing Environment, University of Illinois, 5 pages, Urbana, IL.
Hess, OVF to VM and Back Again, Jun. 23, 2009, Linux Magazine, 2 pages.
Melber, Controlling Privileges of the Administrator Accounts, Jan. 30, 2007, WindowSecurity.com, 4 pages.
Moran et al., Oracle® Security Overview, Dec. 2003, Oracle@, 174 pages.
Wikipedia, Open Virtualization Format, Apr. 5, 2015, WIkipedia, 4 pages.
Office Action received in Canadian Application No. 2850008 dated May 19, 2015.
Office Action received in Canadian Application No. 2,850,011 dated Sep. 1, 2015.
Office Action received in Australian Application No. 2012315939 dated May 19, 2015.
Office Action received in Russian Application No. 2014117208 dated Nov. 30, 2015.
Doumae, K. Cloud in Japan—II Probation into Ability of GIO, Chapter 1—Cloud in Japan and IIJ GIO, G-Cloud Magazine, Japan, K.K. Gijutsu Hyoronsha, Sep. 10, 2010, pp. 100-101.
Nakata, Atsushi, Close up, Nikkei computer, No. 789, Nikkei Business Publications, Inc., Aug. 18, 2011, pp. 68-75.Nakata, A., Close up, Nikkei computer, No. 789, Nikkei Business Publications, Inc., Aug. 18, 2011, pp. 68-75.
Shimizu, M., EC2/S3/EBS, Virtual Server Construction by Cloud Computing, 1st ed., Socym Co., Ltd., Shoichiro Takeda, Aug. 27, 2009, pp. 128-138.
Taniguchi, T., Cloud in Japan—II Probation into Ability of GIO, Chapter 2—Using IIJ Cloud: It's Simple! Establishing the Web Server by Using the GIO Hosting Package, G-Cloud Magazine, Japan, K.K. Gijutsu Hyoronsha, Sep. 10, 2010, pp. 102 109.
Taniguchi, T., Cloud in Japan—II Probation into Ability of GIO, Chapter 3—Full-Scale! Example of Structuring Using GIO Component Service—Encouraging Full-Scale Cloud Infrastructure with Parts Selected and Used, G-Cloud Magazine, Japan, K.K. Gijutsu Hyoronsha, Sep. 10, 2010, pp. 110-117.
International Search Report and Written Opinion received in PCT/US2012/057624 mailed Dec. 6, 2012.
International Preliminary Report on Patentability received in PCT/US2012/057624 dated Apr. 1, 2014.
Supplementary Search Report received in European Application No. 12834770.5 dated Apr. 10, 2015.
Office Action received in Japanese Application No. 2014-533330 dated Mar. 2, 2015.
Office Action received in Australian Application No. 2012315939 dated Mar. 10, 2015.
Office Action received in Singapore Application No. 2014012645 dated Mar. 27, 2015.
Office Action received in Australian Application No. 2012315941 dated Mar. 10, 2015.
Office Action received in Japanese Application No. 2014-533331 dated Feb. 23, 2015.
Supplementary Search Report in European Application No. 12835825.6 dated Jul. 14, 2015.
Notification of Grant received in Singapore Application No. 2014012645 dated Feb. 26, 2016.

\* cited by examiner

AGGREGATION OF OPERATIONAL DATA FOR MERCHANDIZING OF NETWORK ACCESSIBLE SERVICES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

To facilitate increased utilization of data center resources, virtualization technologies allow a single physical computing device to host one or more instances of a virtual machine, which virtual machine instance appears to a user of a data center as an independent computing device. With virtualization, the host computing device can create, maintain, delete, or otherwise manage virtual machines instances in a dynamic manner. In turn, users can request computing resources from the data center, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently. One or more virtual machine instance types are often contained within a service image, which a host computing device may execute in order to implement the desired specific functionality of the virtual machine instance.

In one embodiment, the service image, when executed by virtual machine instance, provides a network accessible service (a.k.a. Web service) corresponding to the software applications/configurations included in the service image. A network accessible service provides specific functionality to other applications and computing resources via a network through application programming interfaces (APIs), which APIs can also be considered a network accessible service or Web service. For example, a service image, when executed, may provide a network accessible database or mass storage service. Once a service image is created, it can be provided to users interested in utilizing the applications and computing resources available from a data center for specific purposes.

However, different service images may also be provided that utilize different applications and/or computing resources for accomplishing the same purpose (e.g., a database). Therefore, it may be difficult for a user to determine which service image may be appropriate for their specific purpose.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, where.

DETAILED DESCRIPTION

Figure 1:
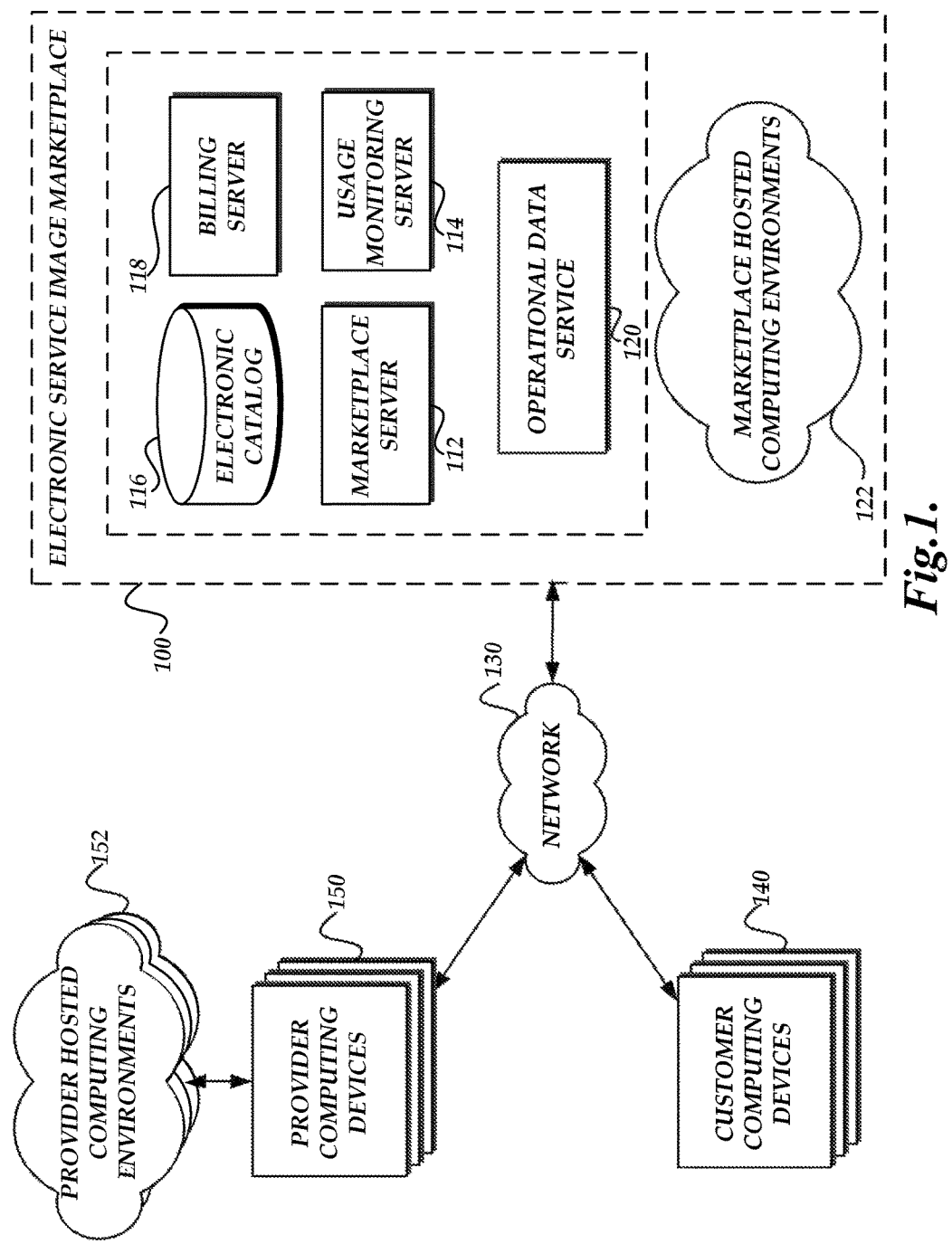
FIG. 1 is a schematic block diagram depicting an illustrative operating environment in which an electronic service image marketplace enables customers to browse descriptions of service images including operational data regarding the service images and acquire service images made available in the electronic service image marketplace by third party providers and the operator of the electronic service image marketplace.

Generally described, aspects of the present disclosure relate to providing an electronic service image marketplace for service images. More specifically, an electronic service image marketplace is provided that permits users to browse descriptions of service images implementing desired functionalities of a virtual machine image. The described service images may be further offered for purchase through the electronic service image marketplace and executed within a hosted computing environment associated with the electronic service image marketplace.

As discussed in greater detail below, embodiments of the electronic service image marketplace may include an operational data service. The operational data service may collect operational data from a plurality of host computing devices executing the selected service image. The operational data service may further analyze the collected operational data to obtain an aggregate measure of the operational data for the selected service image when executed by host computing devices. The analyzed operational data may be further displayed by the electronic service image marketplace within the description of the selected service image. In this manner, the displayed operational data may be employed by a user of the electronic service image marketplace for making decisions regarding service image purchases.

Embodiments of the present disclosure further relate to providing notifications to users of selected service images executed within the hosted computing environment. The notifications may be based upon a comparison of operational data measured for the selected service images and aggregate operational data measured for the corresponding service images. A notification may alert a user that the operational data measured for their executed service image does not conform to aggregate operational data for corresponding service images. The notifications may further enable the user to modify operational data parameters so as to bring the operational data of the selected service image into conformance with the aggregate operational data.

In alternative embodiments, notifications may also be transmitted to service image providers regarding the service images that they have submitted to the electronic marketplace. For example, provider notifications may include information that is not proprietary to customers who have acquired and executed the service image. Rather, the provider notifications may include information such as the aggregate parameter values measured by the operational data service. Notifications may also include aggregated information regarding customer notifications. Examples of such information may include a number of notifications transmitted regarding a selected service image (absolute or per occurrence of the service image), the purpose for the notification, and the like.

Embodiments discussed below may refer to the users of an electronic service image marketplace for service images as customers. However, it may be understood that users are not limited to customers but may include owners, administrators, end users and providers of service images purchased from the electronic service image marketplace.

Embodiments of an electronic service image marketplace for service images may be found in U.S. patent application Ser. No. 13/248,227, filed on Sep. 29, 2011, and entitled, "Electronic Marketplace for Hosted Service Images," (the '227 application) the entirety of which is hereby incorporated by reference. In brief, the electronic service image marketplace may provide an environment with which both providers and customers of service images can interact via a network. In one embodiment, a provider may submit a service image to the electronic service image marketplace for inclusion in an electronic catalog. The provider may submit additional information corresponding to the service image that would be useful to a customer, such as pricing information, usage conditions, a location of a provider hosted computing environment on which the service image can be hosted, or other information.

Customers may employ a user computing device to browse the electronic catalog by interaction with various user interfaces generated by the electronic service image marketplace, described in greater detail below. Upon identifying a service image of interest, the customer may view details of each service image in the electronic catalog, such as the information submitted by the provider of the service image. In some embodiments, a customer may view further information associated with a service image, such as usage statistics by other electronic service image marketplace customers of the service image, reviews by other customers, or recommendations for similar or complementary service images. Accordingly, service images may be surfaced to customers in a variety of ways by the electronic service image marketplace, such as by navigation through a browse tree of services organized by function, type, size, etc. or through recommendations, reviews, etc.

Once a customer selects a service image from the electronic service image marketplace, the customer may purchase or otherwise acquire the service from the electronic service image marketplace. In some embodiments, the customer may be required to submit payment information for the service image prior to launch of the service image. After acquisition of the service image by the customer, the service image may be launched and executed by one or more hosted computing environments. The hosted computing environment may be provided by an operator of the electronic service image marketplace or may be otherwise associated with the electronic service image marketplace. In some embodiments, the third party provider of the acquired service image may provide a hosted computing environment for the service image acquired by the customer via the electronic service image marketplace.

Once the service image is launched and running on a hosted computing environment, the electronic service image marketplace can monitor the usage of functionality or services provided by service image and bill the customer/pay the provider accordingly. Moreover, the electronic service image marketplace may provide the customer with tools to manage, monitor, modify, etc. the service image.

In according with embodiments of the present disclosure, the electronic service image marketplace may be in further communication with and/or include an operational data service. The operational data service may maintain operational data associated with a selected service image. In certain embodiments, the operational data service may maintain operational data associated with at least a portion of the service images available from the electronic service image marketplace. The operational data service may further provide one or more of the maintained operational data to the electronic service image marketplace for inclusion in the electronic catalog.

In an embodiment, the operational data may be any data pertaining to a host computer executing the selected service image and/or the virtual instances within the selected service image. Examples of the operational data may include, but are not limited to, a quality of service of the selected service image executed on a respective host computing device, resources utilized by the host computing device executing the selected service image, parameters regarding the virtual machine instance type of the selected service image, and the like.

In further embodiments, the operational data may be to any data regarding perception of the selected service image and/or functionality of the selected service image. Examples may include, but are not limited to, user reviews, recommendations, and the like.

In an embodiment, the operational data service may be in communication with one or more hosted computing environments including a host computing devices executing a selected service image. The operational data service may receive operational data for the selected service image from respective host computers executing the selected service image. In alternative embodiments, the operational data service may request operational data from host computers executing the selected service. The operational data service may further analyze and store any operational data received from the respective host computing devices (e.g., storage in the electronic catalog).

For example, as discussed in greater detail below, for a selected service image, the operational data service may continuously receive and analyze operational data from host computers executing the selected service image. The operational data may be further stored in the electronic catalog. When a customer requests details regarding a service image, at least a portion of the analyzed operational data may be displayed to the customer, along with other information regarding the service image.

It may be understood that, in certain embodiments, the operational data service does not access data generated by the selected service image executed by respective host computing devices. This data is considered to be proprietary and confidential to the electronic service image marketplace customers and/or providers and would not be accessed by the operational data service. In alternative embodiments, access to data generated by the selected service image by the operational data service may be governed by an End User License Agreement (EULA) between an operator of the electronic service image marketplace and the customer and/or provider. Rather, the operational data service collects data that is available to host computing devices that execute the selected service images, which does not pertain to any confidential or proprietary customer data generated during execution of the selected service image.

In an embodiment, each type of operational data collected by the operational data service may be independently analyzed in order to determine one or more parameters representative of the type of operational data when executed by a host computing device. In certain embodiments, the operational data service may perform analysis continuously as new operational data is received. In further embodiments, the analysis may be performed on the collected operational data, in aggregate (e.g., a statistical analysis).

For example, continue the example above, where the type of operational data collected is the number of instances within the selected service image executed by a host computing device. Further assume that the collected operational data, in aggregate, follows a normal distribution. From the collected operational data, number of instances within the service image over the range of one standard deviation $1\sigma$ from the mean number of instances within the selected service image may be determined.

The analysis performed by the operational data service may further include generating an estimate of a total cost of operation (TCO) of the selected service image. For example, the operational data service may determine from the collected, analyzed operational data that the selected service image, on aggregate, includes a specific software application, is operated within an instance type of a certain size, and employs certain resources of the host computing device (e.g., CPU utilization, I/O utilization, bandwidth, etc.). The cost of each of these operational data, as well as any other operational data of interest, may be summed to provide the TCO for the selected service image. In certain embodiments, the TCO may be provided on a selected basis, such as time (e.g., TCO/hr).

The operational data service may further provide the analyzed operational data to the electronic service image marketplace for display in the electronic catalog. In one embodiment, the operational data service may store the analyzed operational data in the electronic catalog or other storage device the as values to be included in a display generated by the electronic service image marketplace.

This obtained parameter may be compared to the same parameter as analyzed by the operational data service, in aggregate, for the selected service image. If the obtained parameter for the user is not in conformance with the analyzed parameter value, the operational data service may provide the user with a notification. As discussed in greater detail below, the notification may advise the user that their operational data requires adjustment. In one aspect, a measured operational data value may be higher than needed for execution of the service image. Thus, the user may benefit from lower cost of operation if the operational data value were lowered. In another aspect, a measured operational data value may be lower than needed for execution of the service image. Thus, the user may benefit from improved performance if the operational data value were raised.

Further continuing the example above, assume that the operational data value is the number of instances within the selected service image of the user (e.g., 7). Further assume that the operational data service has determined that the number of instances within service images within $1\sigma$ of the mean is 2-5. Therefore, the user may be advised through a notification that they could consider reducing the number of instances within their service image by 2-5.

In alternative embodiments, the operational data service may also generate aggregate information regarding service images. For example, the operational data service may determine how many total notifications are generated for the selected service image, how many notifications are generated for the selected service image that pertain to the same reason for generating the notification (e.g., a same operational data parameter that is out of conformance with an aggregate value of the data parameter), etc.

Notifications may also be provided to service image providers for their submitted service images based upon the aggregated data parameters for the service image generated by the operational data service. For example, one or more aggregate data parameters and/or aggregate notification data may be provided to the service image provider. Beneficially, the service image provider may employ this information when determining best practices for executing service images.

With reference to FIG. 1, a block diagram depicting an illustrative operating environment is shown which includes an electronic service image marketplace 100 that enables customers to browse descriptions of service images including operational data regarding the service images. The electronic service image marketplace 100 may further enable customers to acquire service images made available in the electronic service image marketplace 100 by third party providers or the operator of the electronic service image marketplace 100. Acquired service images may be executed within a hosted computing environment, as discussed in greater detail below.

As illustrated in FIG. 1, the operating environment includes one or more provider computing devices 150 and one or more customer computing devices 140 in communication with an electronic service image marketplace 100 via a network 130. A third party provider, using a provider computing device 150, may submit via the network 130 a service image for a specific type of functionality to the electronic service image marketplace 100. The electronic service image marketplace100 may make the submitted service image, as well as other service images submitted to the electronic service image marketplace 100, available to customers.

Accordingly, a customer, using his or her customer computing device 140, may communicate with the electronic service image marketplace 100 regarding service images made available by the electronic service image marketplace 100. In one embodiment a customer may communicate with the electronic service image marketplace100 in order to browse descriptions of service images made available by the electronic service image marketplace 100. As discussed in greater detail below, the descriptions may include information regarding operational data of the respective service images. In another embodiment, a customer may communicate with the electronic service image marketplace 100 in order to acquire a desired service image. In a further embodiment, a customer may communicate with the electronic service image marketplace 100 in order to launch a service image acquired from a marketplace hosted computing environment 122 operated, maintained, provided or otherwise associated with the operator of the electronic service image marketplace 100. In alternative embodiments, where an acquired service image was submitted to the electronic service image marketplace 100 by a third party provider, the acquired service image may be launched in a provider hosted computing environment 152 that is operated, maintained, provided or otherwise associated with the third party provider.

A hosted computing environment (e.g., marketplace hosted computing environment 122, provider hosted computing environment 152) may include a collection of rapidly provisioned and released computing resources hosted in connection with the electronic service image marketplace 100 or a third party provider. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586, issued on Jan. 4, 2011 and entitled "Configuring Communications Between Computing Nodes" which is hereby incorporated by reference in its entirety. A hosted computing environment may also be referred to as a cloud computing environment.

The provider computing devices 150 and the customer computing devices 140 may communicate with the electronic service image marketplace 100 via a network 130. The provider computing device 150 or customer computing device 140 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like.

Those skilled in the art will appreciate that the network 130 may be any wired network, wireless network, or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

The electronic service image marketplace 100 is illustrated in FIG. 1 operating in a distributed computing environment comprising several computer systems that are interconnected using one or more networks. More specifically, the electronic service image marketplace 100 may include a marketplace server 112, a usage monitoring server 114, an electronic catalog 116, a billing server 118, and an operational data service 120, discussed in greater detail below. However, it may be appreciated by those skilled in the art that the electronic service image marketplace 100 may have fewer or greater components than are illustrated in FIG. 1, In addition, the electronic service image marketplace 100 could include various Web services and/or peer-to-peer network configurations. Thus, the depiction of the electronic service image marketplace 100 in FIG. 1 should be taken as illustrative and not limiting to the present disclosure.

Any one or more of the marketplace server 111 the usage monitoring server 114, the electronic catalog 116, the billing server 118, and the operational data service 120 may be embodied in a plurality of components, each executing an instance of the respective marketplace server 112, usage monitoring server 114, electronic catalog 116, billing server 118, and operational data service 120. A server or other computing component implementing any one of the marketplace server 112, the usage monitoring server 114, the electronic catalog 116, the billing server 118, and the operational data service 120 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective marketplace server 112, usage monitoring server 114, electronic catalog 116, billing server 118, and operational data service 120. The memory may generally include RAM, ROM, and/or other persistent and auxiliary memory.

With further reference to FIG. 1, illustrative components of the electronic service image marketplace 100 will now be discussed. The marketplace server 112 may facilitate network submission by third party providers, and browsing and acquisition by customers, of service images in the electronic service image marketplace 100. Accordingly, a provider, utilizing a provider computing device 150, may submit on or more service images to the electronic service image marketplace 100 via the marketplace server 112. The submitted service images may then be included in an electronic catalog 116. Embodiments of processes by which a provider, utilizing a provider computing device 150, may submit a service image to the electronic service image marketplace 100 are described in greater detail in the '227 application.

The electronic catalog 116 may include information on service images available from a plurality of providers and on service images made available by the operator of the electronic service image marketplace 100. Accordingly, the marketplace server 112 may obtain service image information for service images offered by a plurality of providers and the marketplace 100 and make the service images available to a customer from a single network resource, such as a Web site. A customer may then acquire the service image from the electronic service image marketplace 100 and launch the service image in a hosted computing environment (e.g., the marketplace hosted computing environment 122 or the provider hosted computing environment 152) in a single interaction or order placed with the electronic service image marketplace 100. Beneficially, this eliminates the need for the customer to develop his or her own service image; or research, search or otherwise investigate multiple different providers or other sources for the service image. The electronic catalog may be a catalog containing information regarding both items (such as goods and services) and service images, or may be separate catalogs, with one catalog containing information regarding items and the other catalog containing information regarding services images, without departing from the scope of the present disclosure.

Illustratively, marketplace server 112 may generate one or more user interfaces through which a customer, utilizing a customer computing device 140, may browse service images made available by the electronic service image marketplace 100, submit queries for matching service images, and view information and details regarding specific service images. Embodiments of processes by which a customer, using his or her customer computing device 140, may query the electronic service image marketplace 100, and by which the marketplace server 112 may generate a user interface, may be found in the '227 application.

In an embodiment, the information and details regarding a selected service image of interest may include selected operational data for the selected service image determined by the operational data service 120. As discussed in greater detail below, in one embodiment, the operational data service 120 may collect operational data from one or more host computers executing the selected service image. The collected operational data may be further analyzed, in aggregate, to determine operational data parameters that are generally representative of operational data for the selected service image. The operational data service 120 may provide one or more of these operational data parameters to the marketplace server 112 for display in one or more of the generated user interfaces.

The operational data service 120 may further generate notifications regarding a selected, executed service image of a customer. As further described in detail below, the operational data service may compare one or more current operational data to the analyzed operational data parameters. If the currently measured operational data for the selected service image does not conform to the analyzed operational data parameters, the operational data service 120 may generate a notification to the customer advising them of this discrepancy.

The operational data service 120 may also generate one or more notifications for third-party providers. In one aspect, notifications may be based upon the generated aggregate data. In further embodiments, notifications generated for customers may be further aggregated by the operational data service 120 to generate notifications for the provider. For example, the operational data service 120 may analyze notifications for a selected service image and identify selected information therefrom. Examples may include, but are not limited to, number of total notifications, number of notifications having the same reason for being generated, etc.

After the customer selects a desired service image from the electronic service image marketplace 100, the marketplace server 112 may facilitate the configuration and acquisition of the service image and cause the launching of the service image on a hosted computing environment. In this regard, the marketplace server 112 may receive payment information from the customer computing device 140, as well as information specifying how the service image should be implemented by a hosted computing environment. In some embodiments, the customer may select a specific hosted computing environment to host the selected service image. The specific hosted computing environment may correspond, for example, to the marketplace hosted computing environment 122 associated with the electronic service image marketplace 100, or to a provider hosted computing environment 152 which is associated with the provider of the service image.

Once the service image is launched and running on a hosted computing environment, the electronic service image marketplace 100 can monitor the usage of functionality or services provided by service image and bill the customer/pay the provider accordingly via the usage monitoring server 114 and the billing server 118, respectively. Moreover, the electronic service image marketplace 100 may provide the customer with tools to manage, monitor, modify, etc. the service image. In the illustrated example, the usage monitoring server 114 may be in communication with the marketplace hosted computing environment 122, and is operable to track a usage of the functionality (e.g., Web service) provided by the executed service image. This configuration may be beneficial, for example, where pricing of the service image is dependent on usage of the Web services produced by the service image when executed.

The billing server 118, on the other hand, may be provided to process payments from customers and, in some embodiments, provide payment to the providers of acquired service images. The billing server 118 may receive and provide payment information via interaction with the marketplace server 112. In some embodiments, the billing server 118 may alternatively receive and provide payment information via other processes, such as via an additional server, via telephonic interaction, or other mechanisms.

Figure 2:
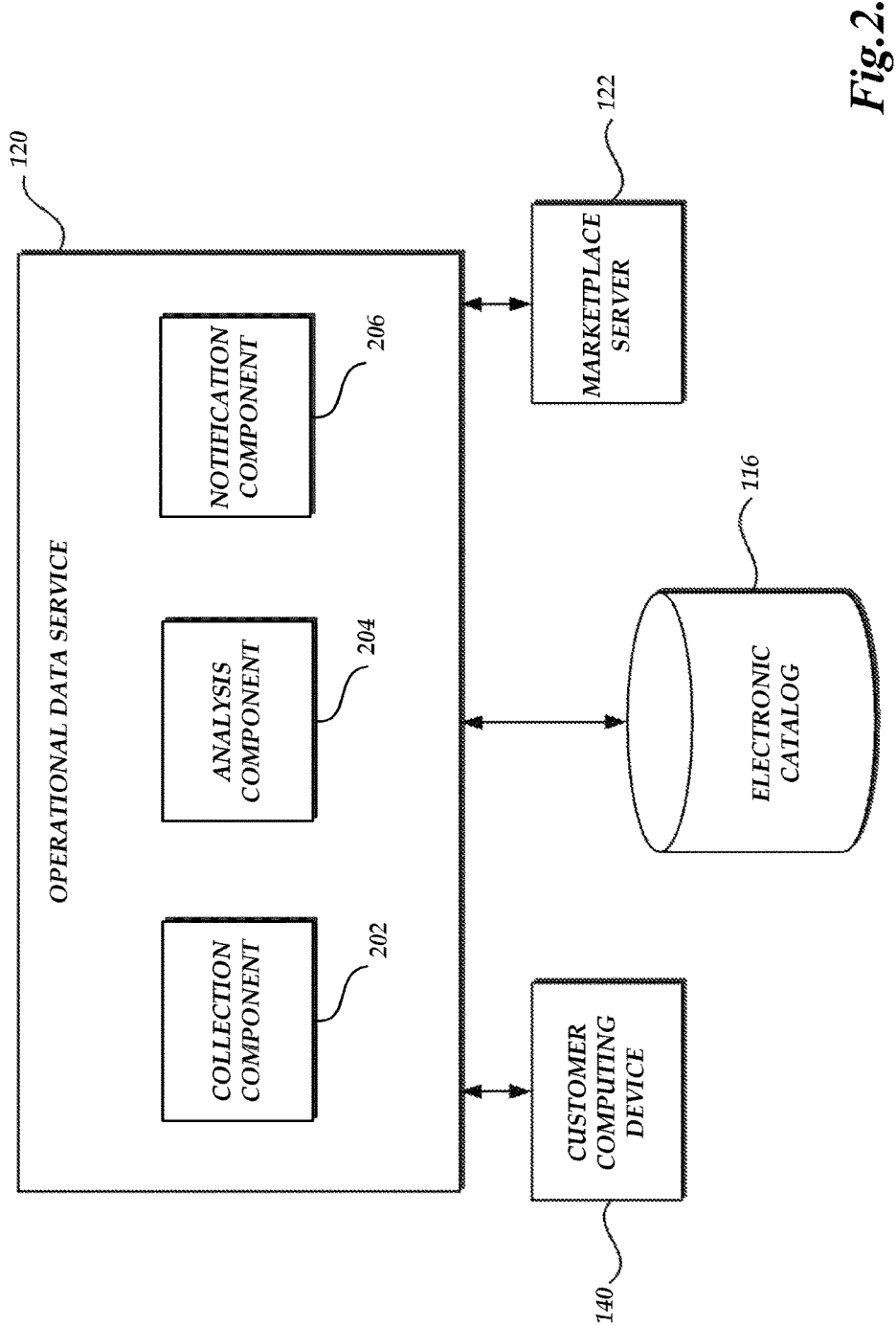
FIG. 2 is a schematic block diagram of certain illustrative components implemented by the operational data service shown in FIG. 1.

With reference to FIG. 2, illustrative components of the operational data service 120 for use in providing aggregate operational data for selected service images executed on a host computing device and notifications regarding selected service images of a customer based upon the aggregate operational data will now be addressed. The operational data service 120 may include a collection component 202, an analysis component 204, and a notification component 206.

The collection component 202 may communicate with host computing devices within hosted computing environments (e.g., marketplace hosted computing environment 122 and/or provider hosted computing environment 152) to collect operational data for a selected service image executed on respective host computing devices. As discussed above, unless authorized by a customer and/or provider, the operational data service does not access any data generated by the selected service images executed by respective host computing devices, Rather, the operational data service collects data regarding the operation of the host computing devices themselves during execution of the selected service image and/or parameters under which the selected service image is executed by respective host computing devices. This operational data does not pertain to any proprietary or confidential customer data generated during execution of the selected service image and, therefore, collection of this operational data does not in any way breach the customer's privacy.

In an embodiment, the operational data for the selected service image may include quality of service of the selected service image. Examples may include, but are not limited to, a percentage of time that the selected service image is operating and/or available to a customer as a function of a selected time duration (i.e., "uptime"), a percentage of time that the selected instance is not operating and/or not available to the user as a function of a selected time duration (i.e., "downtime"), latency, and other quality of service parameters as understood by one of skill in the art of computing services.

In another embodiment, the operational data for the selected service image may include one or more resources employed by the host computing device executing the selected service image. Examples of such resources may include, but are not limited to, bandwidth, CPU utilization, volatile memory utilization of the host computing device, non-volatile memory utilization, input/output (I/O) devices, utilization of the I/O devices, and the like.

In another embodiment, the operational data for the selected service image may include parameters regarding a virtual machine instance type of the selected service image. Examples of the virtual machine instance type may include, but are not limited to, combinations of operating systems or operating system configurations within virtual images of the selected service image, virtualized hardware resources employed by the virtual images of the selected service image (e.g., CPU, volatile and non-volatile memory, I/O devices, etc.), software applications employed by the virtual images of the selected service image (e.g., the software application itself, the version of the software application, etc.), number of virtual instances contained within the selected service image, load balancing across multiple virtual instances contained within the selected service image, and the like.

In one embodiment, operational data for the selected service image may be collected by the collection component 202 from selected host computing devices within a hosted computing environment that are known to execute the selected service image. In one embodiment, the collection component 202 may collect the operational data for the selected service image from all host computing devices within a designated hosted computing environment. In another embodiment, the collection component 202 may collect the operational data for the selected service image from a selected number of host computing devices and/or selected ones of host computing devices within a designated hosted computing environment. In further embodiments, operational data for the selected service image may be obtained by the collection component from operational data stored in a data storage device in communication with the collection component 202 (e.g., a cache).

In another embodiment, one or more specific types of operational data may be selected for collection by the collection service 202. For example, the type or types of operational data collected by the collection service 202 may be selected by an operator of the electronic service image marketplace 100. In an alternative embodiment, the types of operational data collected by the collection service 202 may be determined by programmed logic. In one aspect, service images available from the electronic service image marketplace 100 may be designated by a classification. In another aspect, one or more specific types of operational data may be selected for a service image classification. For example, specific types of operational data collected in the case of service images classified as databases may include a number of instances run per service image, a typical instance type (e.g., small, medium, large, etc.), % average uptime, and estimated TOC/hr.

In an embodiment, the collection service 202 may collect operational data continuously, periodically, aperiodically, or on an interrupt driven basis. For example, the collection service 202 may collect operational data for a selected service image from the time the service image is executed until the time when execution ceases.

In an alternative embodiment, the collection service 202 may collect operational data for a selected service image under different conditions. In one embodiment, the collection service 202 may collect the operational data in response to an event. For example, after a new or updated service image is offered by the electronic service image marketplace 100, the collection service 202 may automatically begin collecting operational data for the new or updated service image. In another embodiment, the collection service 202 may collect operational data at periodic intervals (e.g., once per month). The periodic interval may be increased or decreased depending on parameters including, but not limited to, one or more of the number of installations of the selected service image that are executed, a popularity of the service image within the electronic service image marketplace 100, a classification of the service image, a provider of the service image, and the like.

The collection service 202 may further collect and/or maintain operational data of the selected service image over a selected duration of time for use in analysis of aggregate operational data, as discussed in greater detail below. For example, the duration of time may include a selected time period representative for the selected operational data (e.g., one week, one month, one year, a lifetime of operation of the service image, etc.).

In a further embodiment, the collection service 202 may collect operational data in response to a request (e.g., a request from the marketplace server 112), For example, the marketplace server 112 may receive a request to provide information and details regarding a selected service image for which no operational data has previously been collected. In another example, the marketplace server 112 may receive a request to provide information and details regarding a selected service image for which existing operational data is older than a selected time duration (e.g., greater than one month).

The operational data collected by the collection component 202 may be provided to the analysis component 204 data for analysis of the collected operational data, in aggregate. By aggregating the collected data, one or more parameters representative of a selected operational data type may be determined In one embodiment, the analysis may include a statistical analysis of the data collected for the operational data type. For example, assuming a type of operational data follows a normal distribution, one or more parameters of the normal distribution may be calculated (e.g., mean, median, and/or mode of the distribution, standard deviations of the mean, and the like). The operational data output from the analysis component 204 may be referred to herein as aggregate operational data parameters.

In certain embodiments, the analysis component 204 may omit selected operational data from use in the analysis. For example, the analysis component 204 may omit operational data collected from selected host computing devices that are atypical (e.g., operational data collected from unhealthy service images). Beneficially, such omission may inhibit the calculated aggregate operational data parameters from being skewed in error.

The aggregate operational data parameters may be further employed by the analysis component 204 for use in determining total cost of operation of the selected service image. For example, assume that a service image for a database is determined to employ selected software having a monthly subscription fee, employs selected computing resources having a selected cost/hr, and operates on a virtual instance of a selected size also having a selected cost/hr. All of these costs may be summed by the analysis component 204 to generate an estimated TOC. It may be understood that the estimate is intended merely as a gross estimate of TOC, as it is generated from operational data for selected service image in aggregate and may not be representative of the operating cost of the service image as configured for a specific customer.

The analysis component 204 may further store any generated aggregate operational data parameters and/or estimated TOC for further use by the electronic service image marketplace 100. In one embodiment, the analysis component 204 may store generated aggregate operational data parameters in the electronic catalog 116 and/or in other data storage devices in communication with the operational data service 120.

The analysis component 204 may further compare current or presently measured values for an operational data of interest collected by the collection component to the generated aggregate operational data parameters. In certain embodiments, the operational data of interest may be selected by an operator of the electronic service image marketplace 100, an operator of a hosted computing environment, a customer of the electronic service image marketplace 100, a provider of the electronic service image marketplace 100, and combinations thereof. In alternative embodiments, all operational data measured by the collection component 202 and aggregated by the analysis component 204 may be employed. If a currently measured operational data value is found to be out of compliance with a corresponding aggregate operational data parameter, the analysis component 204 may provide this information to the notification component 206 for notification of the respective customer, as discussed below.

In certain embodiments, a current operational data value may be in conformance with a corresponding generated aggregate operational data parameter when the current operational data value lies within a range of values specified by the generated aggregate operational data parameter. In another embodiment, a current operational data value may be in compliance with a corresponding generated aggregate operational data parameter when the current operational data value lies within a selected amount and/or a selected percentage of a value specified by the generated aggregate operational data parameter (e.g., ±10%).

For example, assume the case where the operational data of interest is a number of instances run and the current value for a customer is 7. Further assume that the aggregate operational data parameter for number of instances run is $1\sigma$ of the mean, calculated to be 3-5. The analysis component 204 may determine that the current value of the operational data of interest for the customer, 7, is not within the range specified by the aggregate operational data parameter. As a result, the analysis component 204 may pass this information to the notification component 206.

The notification component 206 of the operational data service 120 may provide notifications to customers under circumstances when one or more operational data of interest for a customer are not in conformance with the corresponding aggregate operational data parameter. A notification may include a message that informs the customer of the detected non-conformity. Examples of messages may include, but are not limited to, telephone calls, voice-over IP (VOIP) calls, instant messages (IM), short message service (SMS) text messages, and electronic mail messages (e-mail). In further examples, the message may be communicated to the customer via a user interface generated by the electronic service image marketplace 100. The notification may further provide the customer with instructions to adjust the operational data of interest. Operational data of interest may be adjusted by the customer using the electronic service image marketplace 100 through embodiments disclosed the '227 application.

In an embodiment, a notification may be transmitted to the customer when a selected number of current operational data values (e.g., one, two, three, etc) for the customer are not in conformance with the corresponding aggregate operational data parameter. In further embodiments, the selected number may depend upon the operational data value itself. For example, a notification may not be provided to the customer until a high number of non-critical operational data of the customer are out of conformance with the corresponding aggregate operational data parameter. In contrast, a notification may be provided to the customer when a low number of critical operational data of the customer are out of conformance with the corresponding aggregate operational data parameter.

Notifications, different than those provided to the customers, may also be transmitted to service image providers regarding a selected service image. For example, the analysis component 204 may further analyze notifications transmitted to customers. In certain embodiments, specific content of the customer notifications may not be examined, to preserve confidentiality of the customer's service image information. Rather, the analysis may examine information about the notification itself, such as a total number of notifications for the service image, a frequency of notifications for the service image, the purpose for generating the notification, etc.

This information may be analyzed, for example, using a statistical analysis, and one or more parameters of the aggregated notifications may be transmitted to the service image provider. For example, a notification may be transmitted to a service image provider indicating that the average number of customer notifications per executed service image is 1.

Figure 3A:
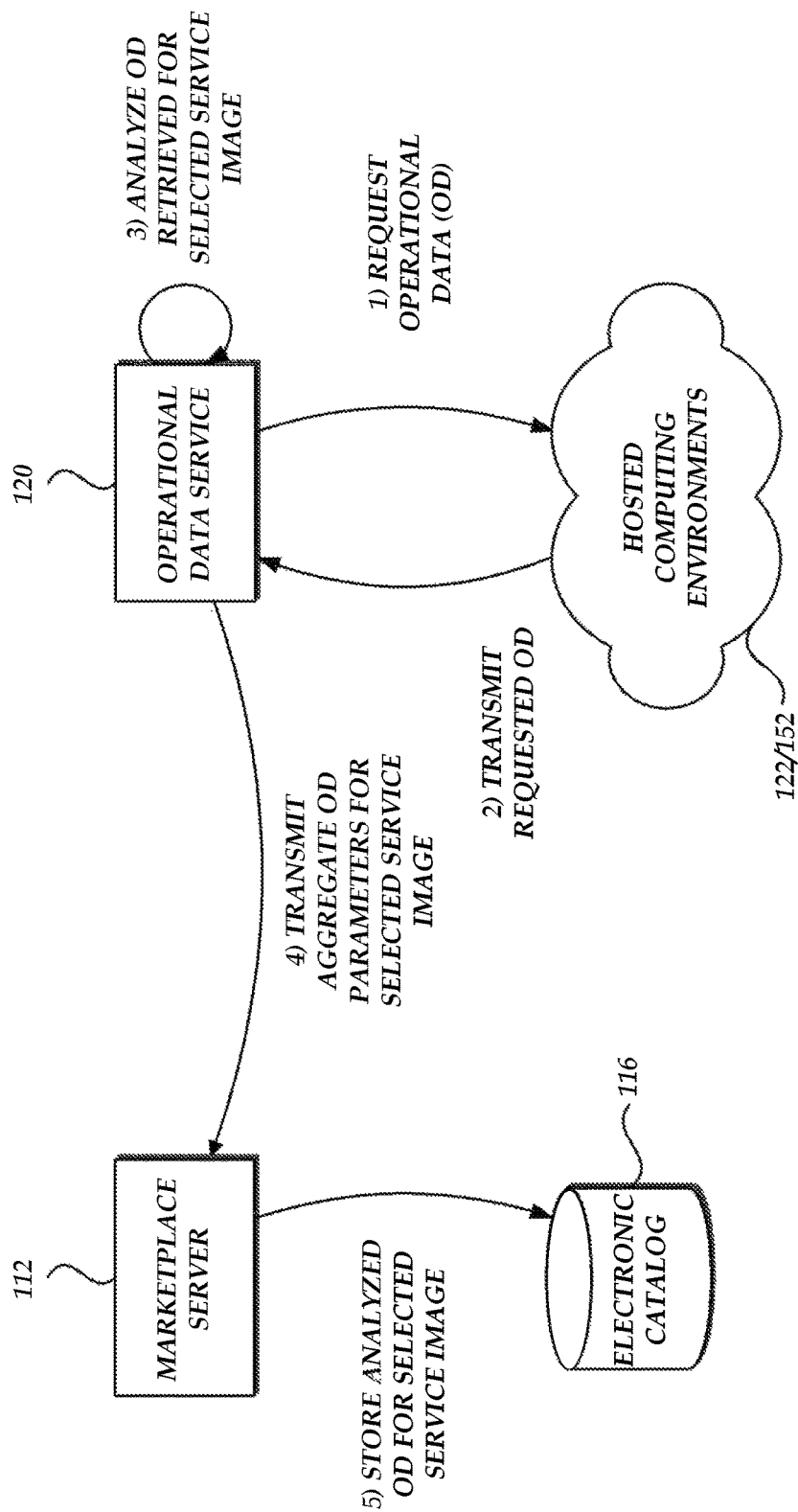
FIG. 3A is a schematic block diagram depicting the operational data service shown in FIG. 1 obtaining operational data regarding a service image of interest.

FIG. 3 is a schematic block diagram of the operational data service 120 collecting operational data for a selected service image. In one embodiment, operational data service 120 requests the operational data from one or more hosted computing devices of a hosted computing environment that execute the selected service image (e.g., marketplace hosted computing environment 122, provider hosted computing environment 152). In certain embodiments, the operational data service 120 may request operational data continuously from the hosted computing environments. In an alternative embodiment, the operational data service 120 may request operational data for the selected service image at selected intervals. As discussed above, the operational data service may collect operational data for the selected service image from all hosted computing devices of the hosted computing environment that execute the selected service image. Alternatively, the operational data may be collected from selected hosted computing devices of the hosted computing environment that execute the selected service image.

Upon receiving the operational data, the operational data service 120 may further analyze the received operational data. In one aspect, aggregate operational data parameters and/or estimated total cost of operation, as discussed above, may be calculated. The generated aggregate operational data parameters may be transmitted to a storage device (e.g., electronic catalog 116) for storage.

Figure 3B:
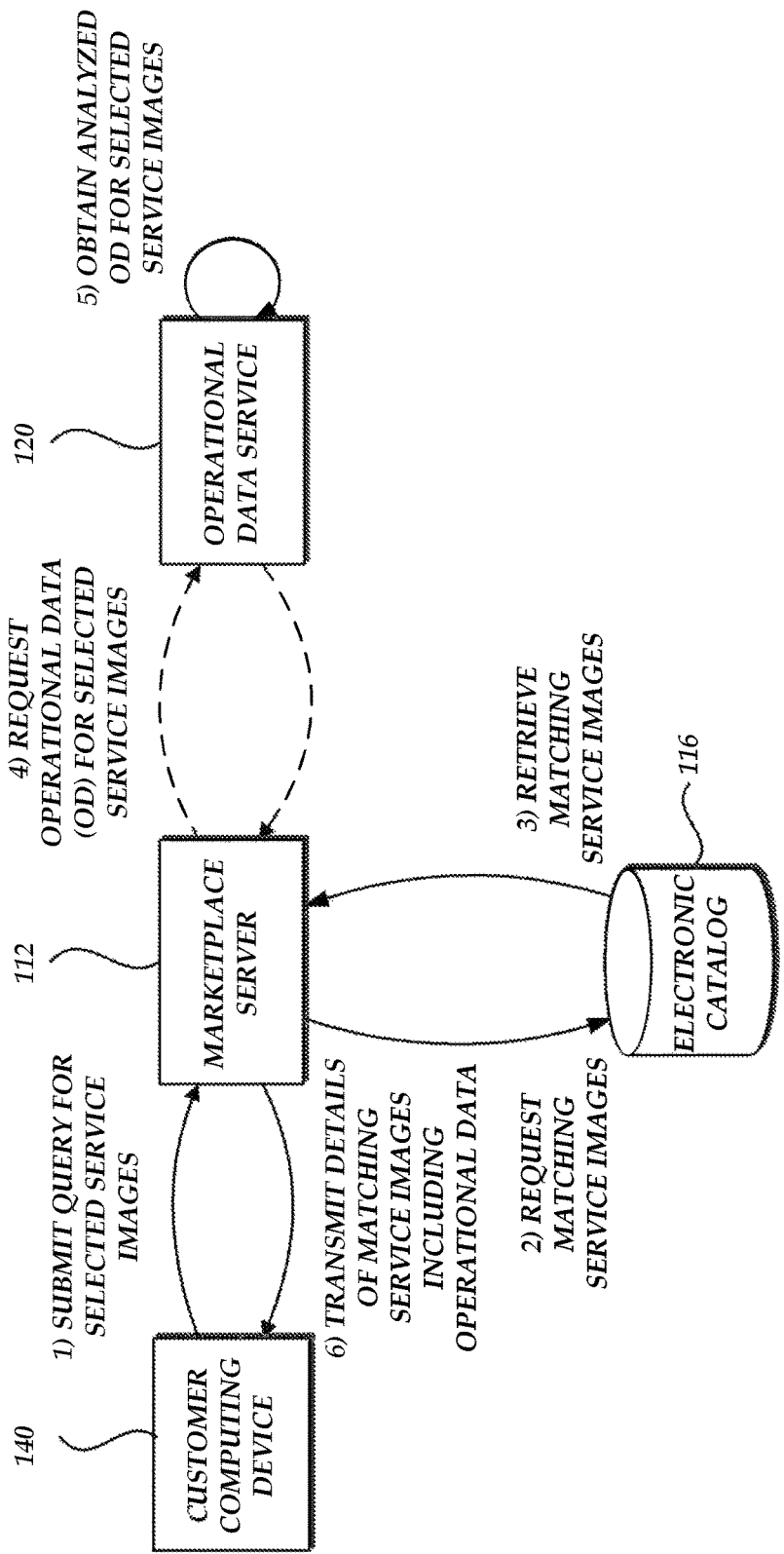
FIG. 3B is a block diagram depicting a customer computing device querying the electronic service image marketplace shown in FIG. 1 for service images of interest.

FIG. 3B is a block diagram depicting a customer computing device 140 querying the electronic service image marketplace 100 shown in FIG. 1 for service images of interest. As depicted in FIG. 3B, the customer computing device 140, on behalf of a customer, submits a query for service images to the electronic service image marketplace 100 that is processed by the marketplace server 112. Illustratively, such a query could be submitted via a user interface, such as via an application on the customer computing device 140 which interacts with the marketplace server 112. The search query may correspond to any aspect of a desired service image, such as the functionality of the service image, the name of the service image, the name of the service image provider, pricing details of the service image, platforms on which the service image may be executed, or any other information that could be related to a service image. Submission and handling of search queries is well known in the art, and therefore will not be discussed in more detail herein.

With continued reference to FIG. 3B, after submission of a search query by the customer computing device 140, the marketplace server 112 may submit a request to the electronic catalog 116 for service images matching the customer submitted query. In response, the electronic catalog 116 may retrieve and return information corresponding to service images which match the customer submitted query. Details of these matching service images may then transmitted to the customer computing device 140. A customer computing device 140 may select any returned service image to view more details about the selected service image.

In certain embodiments, should aggregate operational data parameters for the selected service image not be present within the electronic catalog 116, or another data storage device in communication with the marketplace server 112, the marketplace server 112 may request operational data for the selected service image from the operational data service 120. The operational data service 120 may obtain the requested operational data as discussed above with respect to FIG. 3B.

Figure 4A:
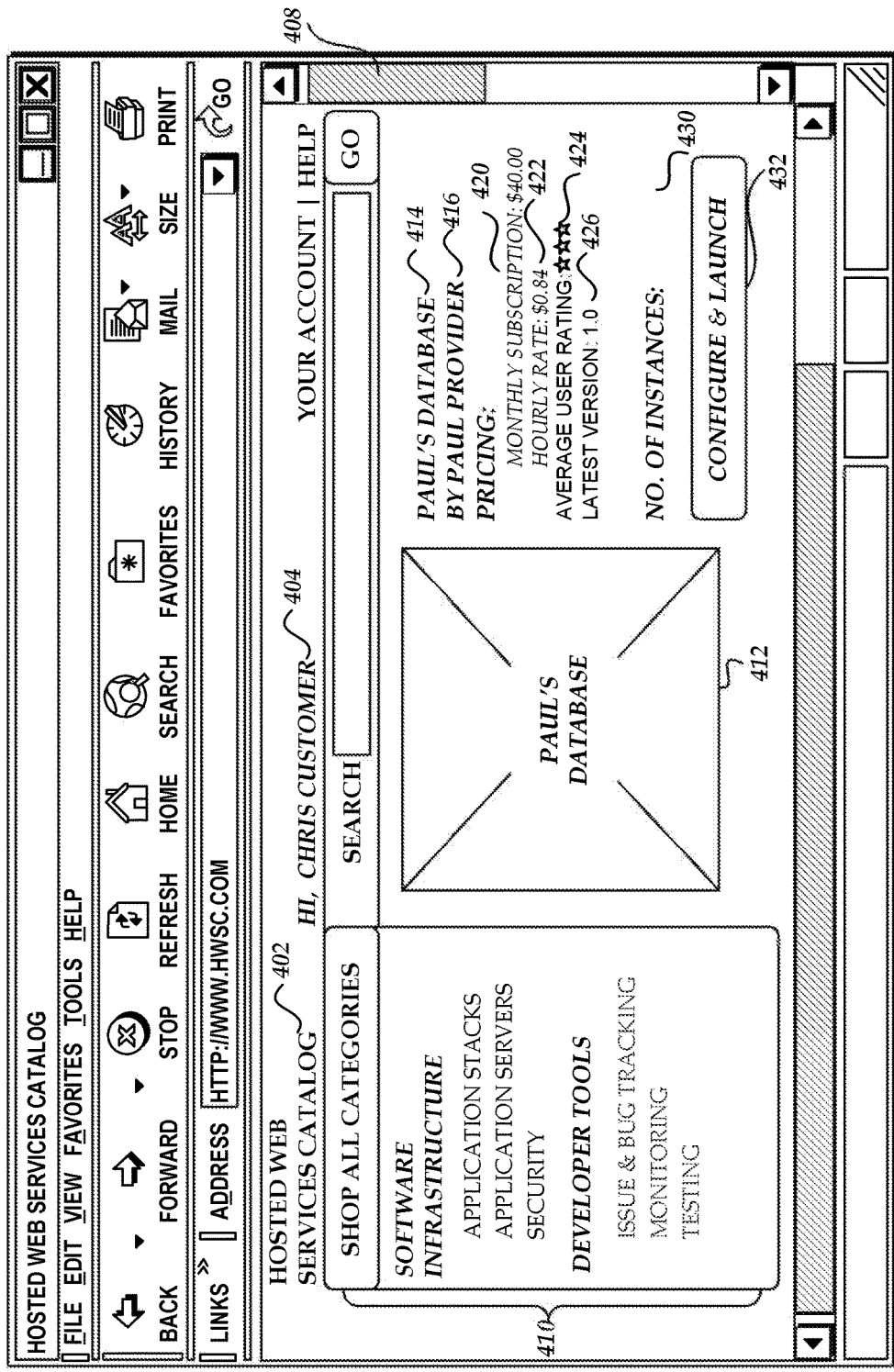
FIG. 4A depicts an illustrative user interface displayed on a customer computing device that presents information associated with a service image available via the service image marketplace shown in FIG. 1.
Figure 4B:
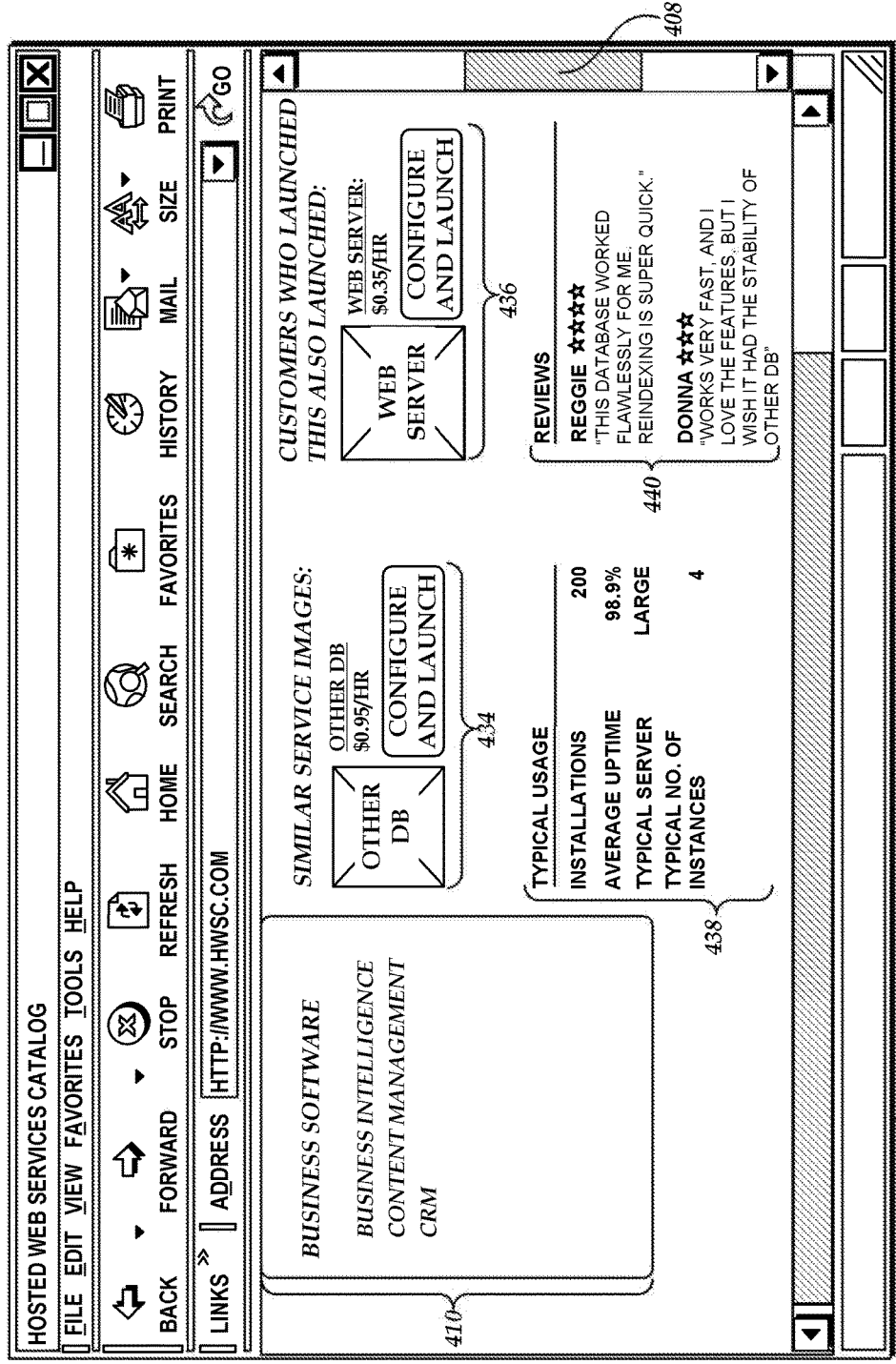
FIG. 4B depicts an illustrative user interface displayed on a customer computing device that presents additional information, including operational data, associated with a service image available via the service image marketplace shown in FIG. 1.

FIGS. 4A and 4B depict an illustrative user interface 400 displayed on a customer computing device that presents information associated with a service image available via the electronic service image marketplace 100. In one embodiment, user interface 400 is generated by marketplace server 112 as a result of navigation by the customer or as a result of selection of a search result returned by the marketplace server 112. While depicted in two figures, one skilled in the art will appreciate that the user interface 400 may be a single user interface and that the customer may view different portions of the interface by use of an interface input, such as scroll bar 408.

As shown in FIG. 4A, the user interface 400 provides information retrieved from the electronic service image marketplace 100, i.e., a Hosted Web Service Catalog" 402 to "Chris Customer" 404, an illustrative customer accessing the "Hosted Web Services Catalog." Because the customer is viewing details regarding a specific offered service image, and may wish to browse to other service images, navigation pane 410 is displayed. Navigation pane 410 contains links that enable a customer to browse and select other service images available via the electronic service image marketplace 100. Currently, the user interface 400 depicts information for the service image "Paul's Database," which corresponds to the service image uploaded by a provider Paul Provider.

Display features 412-426 display information corresponding to the service image. Display feature 412, for example, is a graphic associated with the service image. The graphic may correspond to a logo associated with the service image or with the service image provider. Display features 414 and 416 depict the name of the service image and the provider of the service image, respectively. Display features 420-422 depict pricing information associated with the service image. Display feature 424 depicts reviews given to the service image by users of the "Hosted Web Services Catalog." As depicted, display feature 424 reflects that "Paul's Database" has been given, on average, a three star rating by users of the "Hosted Web Services Catalog." As will be appreciated by those skilled in the art, various other methods of displaying a rating of a service image may be employed. Display feature 426 depicts a version number of the service image; in the current example, version 1.0. In some embodiments, display feature 426 may be selectable to view alternative versions of the selected service image that are available. This may be desirable, for example, where previous versions have different desired characteristics, such as different pricings, features, compatibility, or ratings.

Input box 430 may be utilized by the customer to specify a number of instances of the selected service image that the customer desires. Generally speaking, an instance refers to an individual computing device, virtual or physical, which has executed, loaded, or launched the selected service image. A customer may wish to specify multiple instances, for example, where the customer wishes to distribute processing or load access across multiple instances. In other examples, multiple instances may be functional to interact, or to provide different functionality via the same service image. The number of instances in input box 430 may optionally be associated with a default value, such that the customer is not required to select a number of instances. After inputting the desired number of instances (if necessary), the customer may activate input button 432 to further configure and launch the viewed service image. An embodiment of a user interface that may be used to further configure and launch a service image is discussed in detail in the '227 application.

With reference to FIG. 4B, an additional portion of user interface 400 regarding the "Paul's Database" service image is displayed. As discussed above, the customer may view this additional portion of the user interface by interacting with interface window 400, such as by moving the scroll bar 408.

FIG. 4B depicts additional information regarding the "Paul's Database" service image via display features 434-440. Display feature 434 depicts information regarding other service images which are similar in some fashion to "Paul's Database." In the current example, "Other DB" is an alternative service image available via the electronic service image marketplace 100 which competes with and offers similar functionality to "Paul's Database." Such service images may be identified, for example, by analyzing which database customers ultimately purchase after viewing a service image, or by categorizing service images and displaying images within the same category. Various other mechanisms by which similar service images may be identified are well known in the art.

Similar to display feature 434, display feature 436 displays service images which are commonly purchased in conjunction with "Paul's Database." In this example, customers who launched at least one instance of "Paul's Database" have frequently also launched an instance of the "Web Server" service image. Both display features 434 and 436 have additional information regarding their relevant service images, such as graphical and pricing information. Input buttons may be provided along with display features 434 and 436 to allow a customer to select the relevant service image for configuration and launch.

Illustrative display features 438 and 440 depict still more information regarding the "Paul's Database" service image. Display feature 438 depicts aggregate operational data parameters generated by the operational data service for the "Paul's Database" service image. In the illustrative display feature 438, the operational data may include the number of installations of the service image which have occurred, the average uptime of the installed service images (which may correspond with a reliability/quality of service of the service image), the typical type of computing device on which the service image is launched, and the typical number of instances of the service image which are launched by a customer.

Display feature 440 depicts individual reviews generated by users of the electronic service image marketplace 100 regarding "Paul's Database." Each review may have information such as a rating of the service image on a given scale, and an authored comment portion regarding the service image. In some embodiments, additional or alternative display features may be depicted regarding a service image.

Figure 5:
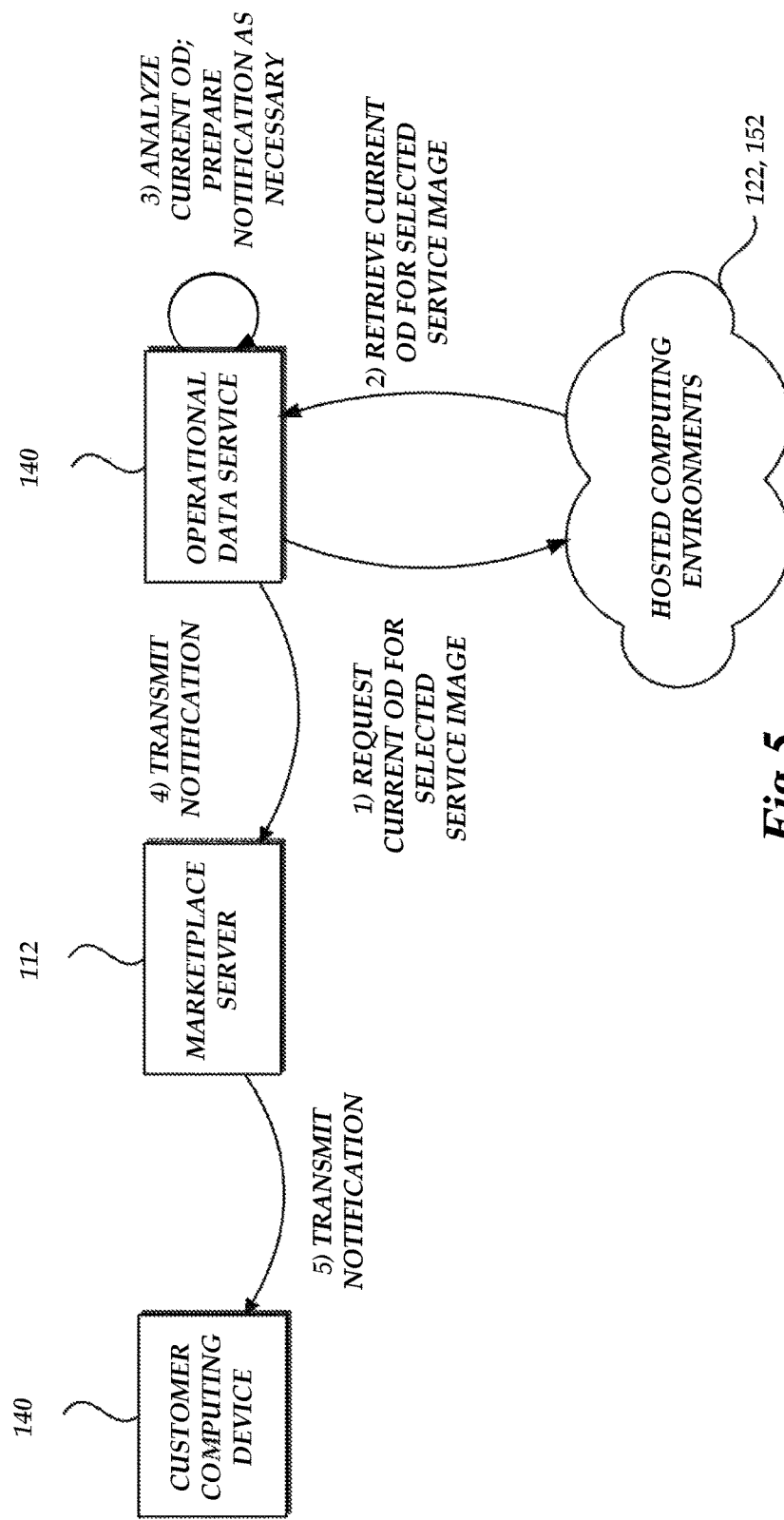
FIG. 5 is a block diagram depicting transmission of a notification to a customer computing device from the operational data service in response to measurement of current operational data for a service images of interest of the customer.

FIG. 5 is a block diagram depicting the operational data service transmitting a notification to a customer regarding operational data of a selected service image of the customer. As depicted in FIG. 5, the operational data service 120 may concurrently analyze operational data obtained from the hosted computing environments 122, 152 for the selected service image to generate aggregate operational data parameters as well as compare the obtained operational data with the aggregate operational data parameters for the selected service image, as discussed above. If a current operational data of a selected service image of a customer is not in conformance with the corresponding aggregate operational data parameter value, the operational data service 120 may generate a notification to the customer. The notification may advise the customer of the non-conformity of the operational data of the selected service image. The notification may further include a recommended action and/or instructions for performing the recommended action.

Figure 6:
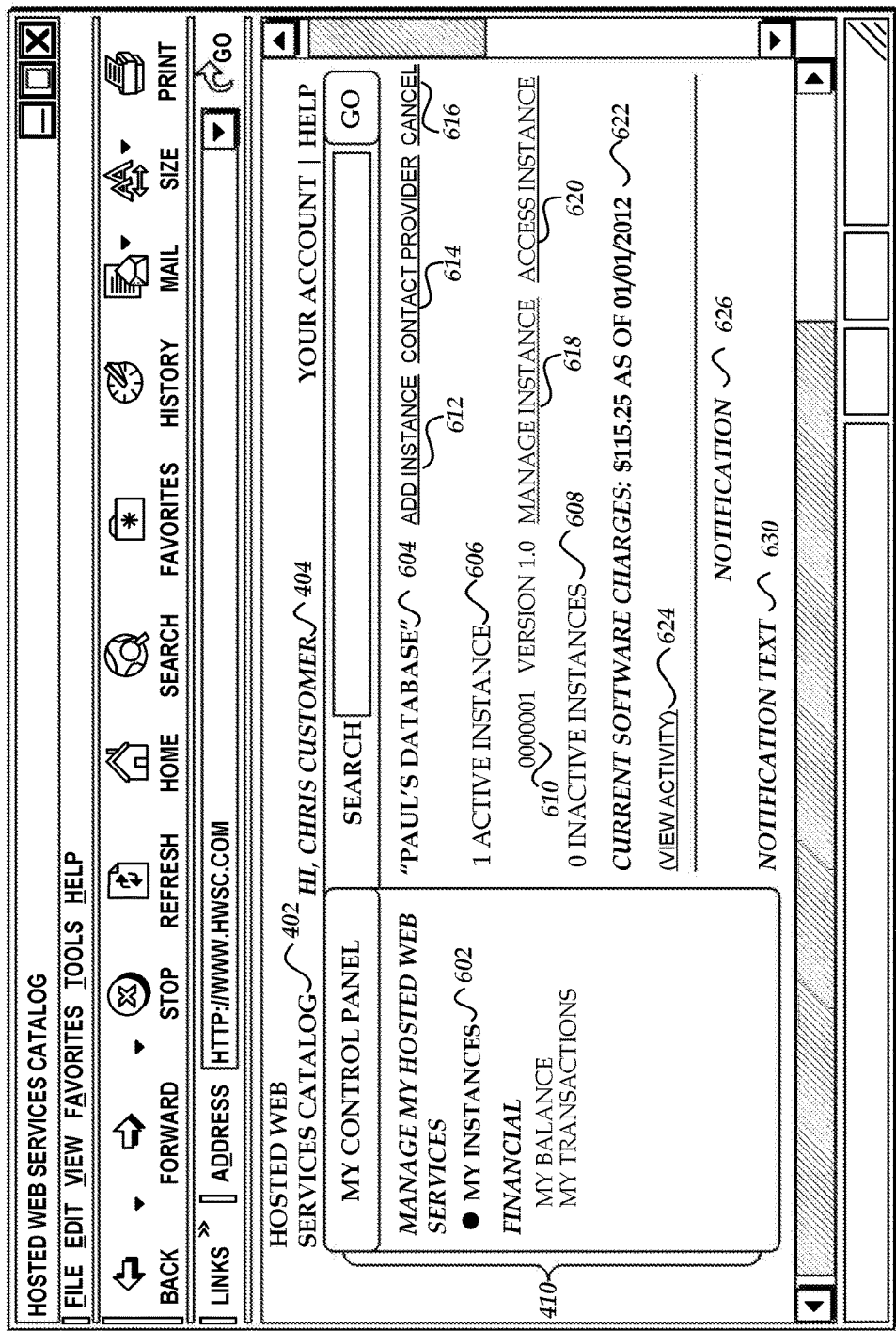
FIG. 6 depicts an illustrative user interface displayed on a customer computing device that presents details regarding one or more hosted service images acquired by the customer from the electronic service image marketplace shown in FIG. 1.

In an embodiment, the notification may be transmitted to the customer directly or via a component of the electronic service image marketplace 100. Examples of notifications transmitted directly to the customer may include, but are not limited to, telephone calls, voice-over IP (VOIP) calls, instant messages (IM), short message service (SMS) text messages, and electronic mail messages (e-mail). In a further example, the notification may be communicated to the customer via a user interface generated by the electronic service image marketplace 100. FIG. 6 illustrates one embodiment of a user interface 600 for displaying information regarding acquired service images, including notifications regarding operational data. As shown in FIG. 6, the user interface 600 enables a customer to receive information regarding services images acquired via the electronic service image marketplace 100, i.e., the "Hosted Web Services Catalog," 402. The current user of the "Hosted Web Services Catalog" is Chris Customer 404. A navigation panel 410 directs the customer to various other features offered by the electronic service image marketplace 100.

Embodiments of the user interface objects 602-624 are discussed in greater detail in the '227 application. In brief, in the illustrative example of FIG. 6, Chris Customer has selected the "My Instances" link 602. The resultant user interface 600 gives Chris Customer access to information regarding instances of service images launched via the electronic service image marketplace 100. The user interface object 604 reflects a title of a service image which Chris Customer has previously acquired. In this example, Chris Customer has acquired service images titled both "Paul's Database" and "Web Server." For the purposes of illustration, only the instance reflected by user interface object 604 will be discussed further.

It will be appreciated by one skilled in the art that information regarding multiple additional service image titles may be displayed via the same or a similar user interface. User interface objects 606 and 608 reflect the current status of instances of the "Paul's Database" service image. User interface objects 612-616 enable a customer to modify the configuration of an acquired service image. In the current example, each instance of a service image is identified by a unique instance identifier 610. User interface object 618 is selectable by Chris Customer to display management functions associated with the instance. Chris Customer can select link 620 in order to access the corresponding instance. User interface object 622 depicts the current charges associated with usage of the service image. Chris Customer may select user interface object 624 to view details associated with the current charges, such as a detailed billing report.

The user interface object 626 may indicate that a notification has been issued for the selected service image. The user interface object 630 may provide a description of the notification. For example, as discussed above in the case where the number of instances run is out of conformance, the notification may read, "The number of instances run is greater than typical for "Paul's Database. You may wish to consider reducing the number of instances run."

Figure 7:
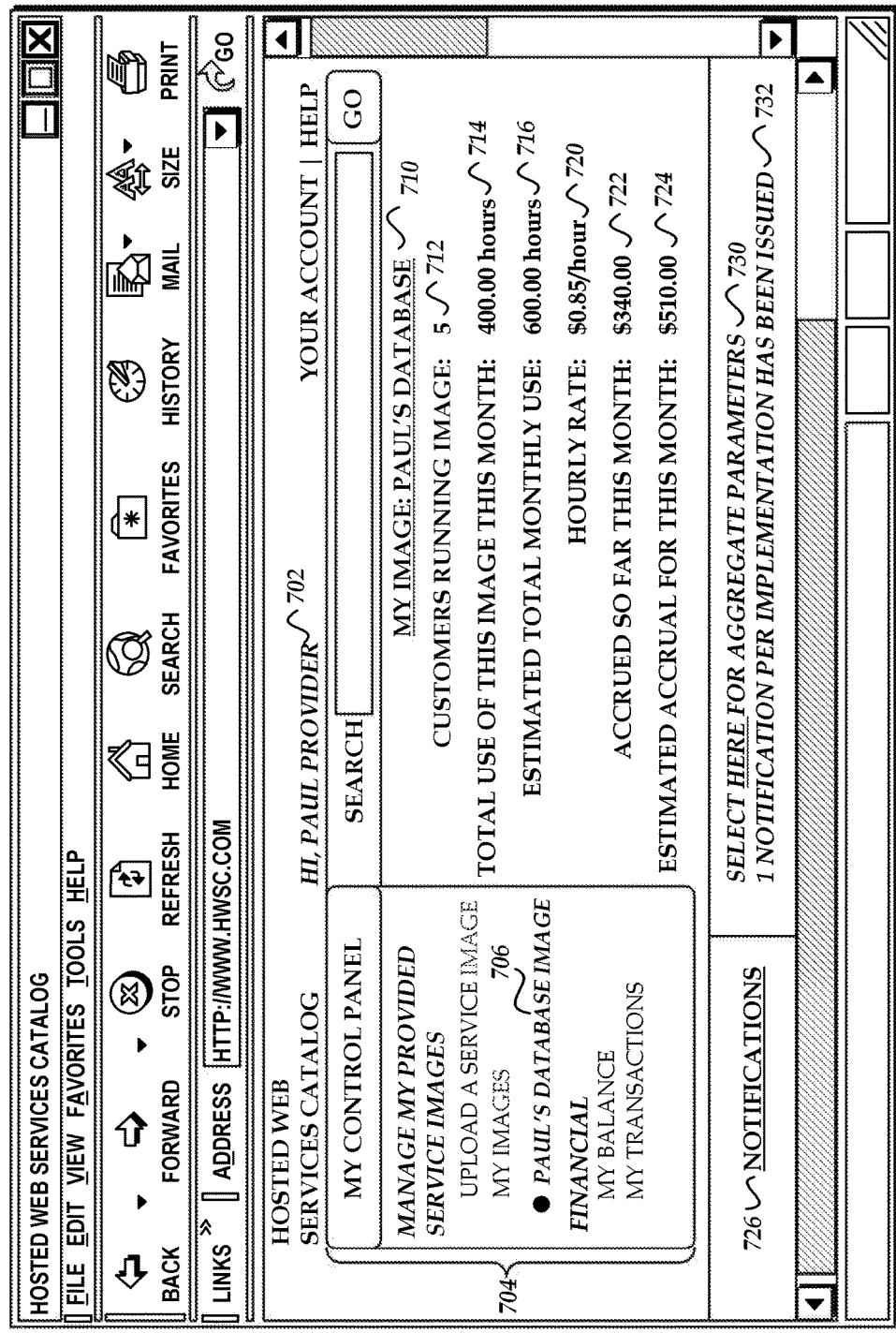
FIG. 7 depicts an illustrative user interface displayed on a provider computing device that presents details regarding one or more service images submitted by the provider to the electronic service image marketplace shown in FIG. 1.

With reference to FIG. 7, an illustrative user interface 700 displayed on a provider computing device 150 that details information regarding a service image of a provider is depicted. As shown in FIG. 7, the user interface 700 enables a provider to receive information regarding service images it has provided to the electronic service image marketplace 100, i.e., the "Hosted Web Services Catalog." The current user of the "Hosted Web Services Catalog" is Paul Provider 702, who has provided the service image "Paul's Database" to the electronic service image marketplace 100. To reflect that Paul Provider has provided this service image, a navigation panel 704 displays a link 706 under the heading "My Images," which is selectable by a customer to view information about the provided service image.

The user interface 700 is reflective of Paul Provider's selection of link 706. In brief, display features 710-726 may depict information regarding the corresponding service image. Additional discussion of the user interface 700 may be found in the '227 application. For example, the depicted information may include, but is not limited to, a service image title 710, current number of customers which have acquired the instance 712, and a number of hours the service image has been used for the current month 714. The user interface 700 may further include an estimated number of total hours the service image will be used during the month, based on the current usage 716 and an hourly rate associated with usage of the service image, as set by the Paul Provider 720. Display features 722 and 724 reflect both current and estimated monthly accruals associated with usage of the service image by customers.

The user interface 700 may further include provider notifications 726 regarding the selected service image. The provider notifications may include information regarding the selected service image that is not proprietary to any customers, such as the aggregate operational data for the service image determined by the operational data service 120. For example, as illustrated in FIG. 7, the provider may select a notification 730 to obtain a comprehensive report on the aggregate operational data parameters for the selected service image.

In further embodiments, the notifications 726 may also include aggregated information regarding customer notifications. Examples of such information may include a number of notifications transmitted regarding a selected service image (absolute or per occurrence of the service image), the purpose for the notification, and the like. For example, as further illustrated in FIG. 7, notification 732 discloses the number of notifications per implementation.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in she flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing an electronic service image marketplace for service images comprising:
at least one electronic catalog configured to at least store a plurality of service images, each of the plurality of service images associated with pricing information and capable of being executed in at least one of a hosted computing environment associated with a provider of the service image and a hosted computing environment associated with the electronic service image marketplace; and a marketplace computing device in communication with the at least one electronic catalog, the computing device comprising one or more hardware processors configured with executable instructions that are configured to at least:
generate a user interface that presents, to a customer, information regarding the service images stored in the electronic catalog;
cause a service image selected by a customer from the electronic catalog to be executed within a hosted computing environment selected by the customer, such that one or more services corresponding to the selected service image are implemented by the at least one hosted computing environment;
measure one or more selected operational data from the selected hosted computing environment executing the selected service image;
calculate one or more operational data parameters related to the measured one or more selected operational data;
compare the calculated one or more operational data parameters to one or more aggregate operational data parameters to determine whether the one or more calculated operational data parameters are in conformance with the one or more aggregate operational data parameters, wherein the one or more aggregate operational data parameters are calculated based at least in part on operational data collected from service images corresponding to the selected service image;
based on a determination that the calculated one or more operational data are not in conformance with the one or more aggregate operational data parameters, transmit a notification to the customer comprising a recommendation for the customer to modify the one or more operational data parameters of the selected service image to be in conformance with the aggregate operational data parameters;
display the one or more calculated operational data parameters for the selected service image and the one or more aggregated operational data parameters in the information presented to the customer in the user interface; and
cause the one or more operational data parameters of the selected service image to be modified in accordance with the recommendation in order to bring the selected service image into conformance with the aggregate operational data parameters.

2. The system of claim 1, wherein the one or more calculated operational data parameters comprise one or more of: a quality of service of the selected service image executed on a respective host computing device of the selected hosted computing environment, resources utilized by a respective host computing device of the selected hosted computing environment, and parameters regarding a virtual machine instance type of the selected service image.

3. The computer-implemented method of claim 2, wherein parameters regarding a virtual machine instance type comprise one or more of: combinations of operating systems or operating system configurations within a virtual image of the selected service image, virtualized hardware resources employed by the virtual images of the selected service image, software applications employed by the virtual images of the selected service, a number of virtual instances contained within the selected service image, and load balancing across multiple virtual instances contained within the selected service image.

4. The system of claim 1, wherein the marketplace computing device is further operative to at least:
   calculate a total cost of operation of the selected service image executed on the selected hosted computing environment based at least in part on the one or more calculated operational data parameters; and
   transmit the calculated total cost of operation to the electronic catalog.

5. The system of claim 1, wherein the at least one electronic catalog is further configured to at least store, for each of the plurality of service images, usage conditions associated with the service image, and wherein the marketplace computing device is further configured to, prior to causing the selected service image to be executed by the selected at least one hosted computing environment, verify that the customer has accepted the usage conditions associated with the selected service image.

6. The system of claim 1 wherein the marketplace computing device is further configured to at least:
   receive, from the customer, a selection of additional entities which may access the implemented one or more services corresponding to the selected service image; and
   transmit, to the selected at least one hosted computing environment, information corresponding to the additional entities.

7. A system for displaying operational data regarding service images within an electronic service image marketplace, the system comprising:
   an electronic data store; and
   a computing device in communication with the data store, the computing device systems comprising one or more hardware processors configured with specific executable instructions that are operative to at least:
      store, in the electronic data store, one or more selected operational data that are measured from a hosted computing environment executing a selected service image that implements one or more network accessible services;
      calculate one or more operational data parameters related to the measured operational data;
      transmit the one or more calculated operational data parameters to an electronic catalog of service images for storage in association with the executed, selected service image, the electronic catalog of service images storing data related to a plurality of service images;
      compare the calculated one or more operational data parameters to one or more aggregate operational data parameters to determine whether the one or more calculated operational data parameters are in conformance with the one or more aggregate operational data parameters, wherein the one or more aggregate operational data parameters are calculated based at least in part on operational data collected from service images corresponding to the selected service image;
      based on a determination that the calculated one or more operational data are not in conformance with the one or more aggregate operational data parameters, transmit a notification to the customer comprising a recommendation for the customer to modify one or more operational data parameters of the selected service image to be in conformance with the aggregate operational data parameters; and
      cause the one or more operational data parameters of the selected service image to be modified in accordance with the recommendation in order to bring the selected service image into conformance with the aggregate operational data parameters.

8. The system of claim 7, wherein the one or more calculated operational data parameters comprise one or more of: a quality of service of the selected service image executed on a respective host computing device of the hosted computing environment, resources utilized by a respective host computing device of the hosted computing environment, and parameters regarding a virtual machine instance type.

9. The system of claim 8, wherein parameters regarding a virtual machine instance type comprise one or more of: combinations of operating systems or operating system configurations within a virtual image of the selected service image, virtualized hardware resources employed by the virtual images of the selected service image, software applications employed by the virtual images of the selected service, a number of virtual instances contained within the selected service image, and load balancing across multiple virtual instances contained within the selected service image.

10. The system of claim 7, wherein the computing device is further operative to at least:
    calculate a total cost of operation of the selected service image executed on the hosted computing environment based at least in part on the one or more calculated operational data parameters; and
    transmit the calculated total cost of operation to the electronic catalog.

11. The system of claim 7, wherein the selected service image includes at least one application program.

12. The system of claim 7, wherein executing the selected service image within the hosted computing environment includes causing the selected service image to be executed by a virtual computing device.

13. A computer-implemented method for displaying operational data regarding service images within an electronic service image marketplace, the method comprising:
    under control of one or more computing devices comprising one or more hardware processors configured with executable instructions,
    causing display of at least one service image from an electronic catalog of service images, wherein the at least one service image is offered for acquisition, and wherein the at least one service image, when executed on a hosted computing environment, implements one or more network accessible services;
    receiving, from a customer, a selection of an offered service image and a hosted computing environment in which the selected service image is to be executed;
    causing the selected service image to be executed within the selected hosted computing environment, such that the one or more network accessible services corresponding to the selected service image are implemented;
    measuring a selected operational data of the hosted computing environment executing the selected service image;
    calculating one or more operational data parameters related to the measured operational data;
    comparing the calculated one or more operational data parameters to one or more aggregate operational data parameters to determine whether the one or more calculated operational data parameters are in conformance with the one or more aggregate operational data parameters, wherein the one or more aggregate operational data parameters are calculated based at least in part on operational data collected from service images corresponding to the selected service image;

based on a determination that the calculated one or more operational data are not in conformance with the one or more aggregate operational data parameters, transmitting a notification to the customer comprising a recommendation for the customer to modify one or more operational data parameters of the selected service image to be in conformance with the aggregate operational data parameters; and cause the one or more operational data parameters of the selected service image to be modified in accordance with the recommendation in order to bring the selected service image into conformance with the aggregate operational data parameters.

14. The computer-implemented method of claim 13, further comprising causing display of the one or more calculated operational data parameters with the at least one service image from the electronic catalog of service images.

15. The computer-implemented method of claim 13, wherein the one or more calculated operational data parameters comprise one or more of a quality of service of the selected service image executed on a respective host computing device of the selected hosted computing environment, resources utilized by a respective host computing device of the selected hosted computing environment, and parameters regarding a virtual machine instance type of the selected service image.

16. The computer-implemented method of claim 15, wherein parameters regarding a virtual machine instance type comprise one or more of: combinations of operating systems or operating system configurations within a virtual image of the selected service image, virtualized hardware resources employed by the virtual images of the selected service image, software applications employed by the virtual images of the selected service, a number of virtual instances contained within the selected service image, and load balancing across multiple virtual instances contained within the selected service image.

17. The computer-implemented method of claim 13, further comprising:
calculating a total cost of operation of the selected service image executed on the selected hosted computing environment based at least in part on the one or more calculated operational data parameters; and
transmitting the calculated total cost of operation to the electronic catalog.

18. The computer-implemented method of claim 13, wherein the selected service image includes at least one application program.

19. The computer-implemented method of claim 13, wherein causing the selected service image to be executed within the selected hosted computing environment includes causing the selected service image to be executed by a virtual computing device.

20. The computer-implemented method of claim 13, further comprising:
identifying at least one calculated operational data parameter that does not conform to a corresponding aggregate operational data parameter;
determining the customer associated with the selected service image from which the at least one calculated operational data parameter that does not conform to the corresponding aggregate operational data parameter is measured; and
transmitting a notification to the customer including a description of the at least one calculated operational data parameter that does not conform to the corresponding aggregate operational data parameter.

21. The computer-implemented method of claim 20, wherein the at least one calculated operational data parameter does not conform with the corresponding aggregate operational data when either:
a measured value of the at least one calculated operational data parameter lies outside a range of values associated with the corresponding aggregate operational data parameter; or
a measured value of the at least one calculated operational data parameter lies outside a selected percentage of a value specified by the corresponding aggregate operational data parameter.

22. A computer readable, non-transitory storage medium having computer executable modules for generating an electronic service image marketplace for service images, the computer executable modules comprising:
a marketplace module in communication with at least one electronic catalog, the marketplace module configured to at least generate for display information regarding a plurality of service images, each service image of the plurality of service images capable of being executed in at least one of a hosted computing environment associated with a provider of the service image and a hosted computing environment associated with the electronic service image marketplace; and
an operational data module in communication with the at least electronic image catalog, the operational data module comprising:
a data collector module that obtains one or more selected operational data of a hosted computing environment executing a selected service image that implements one or more network accessible services; and
an analyzer module that calculates one or more operational data parameters related to the measured operational data, and compares the calculated one or more operational data parameters to one or more aggregate operational data parameters to determine whether the one or more calculated operational data parameters are in conformance with the one or more aggregate operational data parameters, wherein the one or more aggregate operational data parameters are calculated based at least in part on operational data collected from service images corresponding to the selected service image;
wherein the operational data module is further operative to transmit a notification to the customer comprising a recommendation for the customer to modify one or more operational data parameters of the selected service image to be in conformance with the aggregate operational data parameters based, at least in part, on a determination that the calculated one or more operational data are not in conformance with the one or more aggregate operational data parameters; and
wherein the marketplace module is further operative to cause the one or more operational data parameters of the selected service image to be modified in accordance with the recommendation in order to bring the selected service image into conformance with the aggregate operational data parameters.

23. The computer readable storage medium of claim 22, wherein the one or more calculated operational data parameters comprise one or more of: a quality of service of the selected service image executed on a respective host computing device of the hosted computing environment, resources utilized by a respective host computing device of the hosted computing environment, and parameters regarding a virtual machine instance type of the selected service image.

24. The computer readable storage medium of claim 23, wherein parameters regarding a virtual machine instance type comprise one or more of combinations of operating systems or operating system configurations within a virtual image of the selected service image, virtualized hardware resources employed by the virtual images of the selected service image, software applications employed by the virtual images of the selected service, a number of virtual instances contained within the selected service image, and load balancing across multiple virtual instances contained within the selected service image.

25. The computer readable storage medium of claim 22, wherein the analysis component is further operative to at least:
  calculate a total cost of operation of the selected service image executed on the hosted computing environment based at least in part on the one or more calculated operational data parameters; and
  transmit the calculated total cost of operation to the electronic catalog.

26. The computer readable storage medium of claim 22, wherein the selected service image includes at least one application program.

\* \* \* \* \*